June 6, 1961  J. VANI ET AL  2,987,067
WASHING DEVICES
Filed Aug. 22, 1957  4 Sheets-Sheet 1
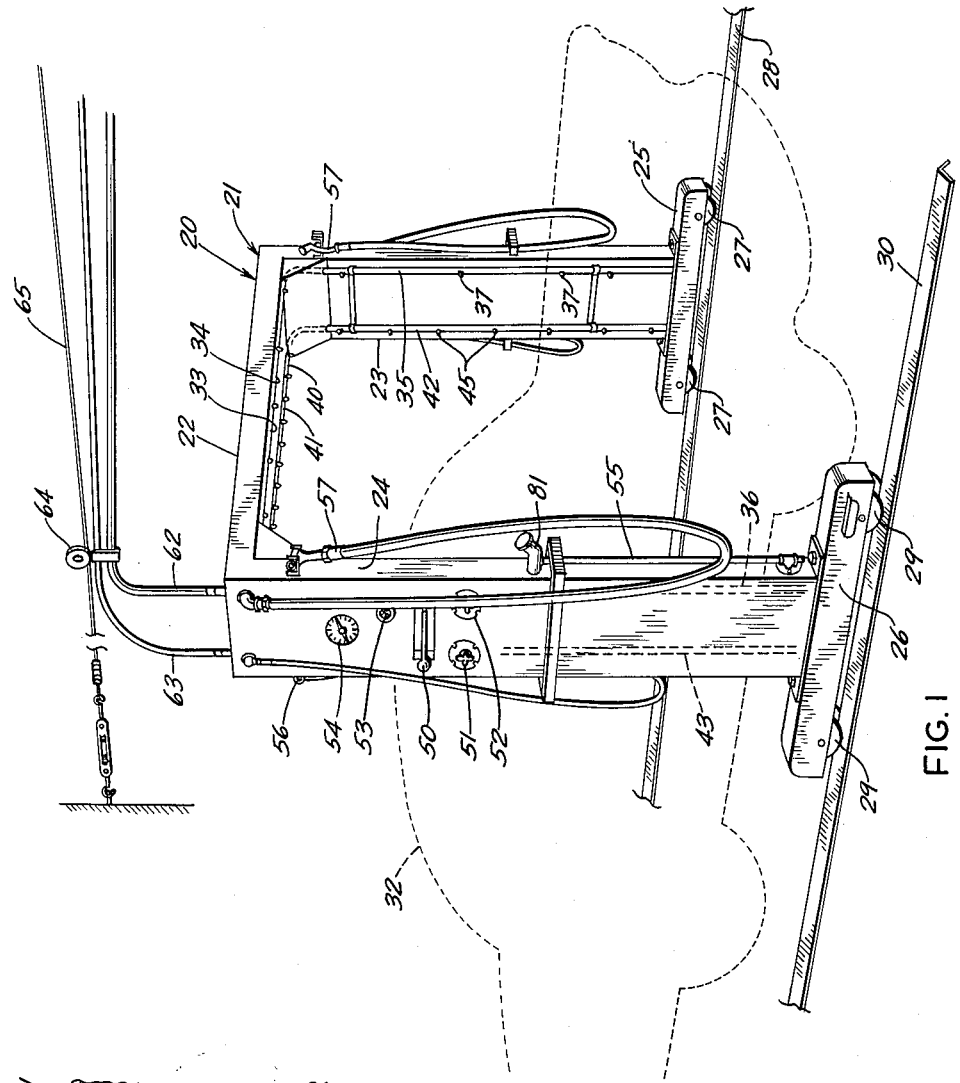
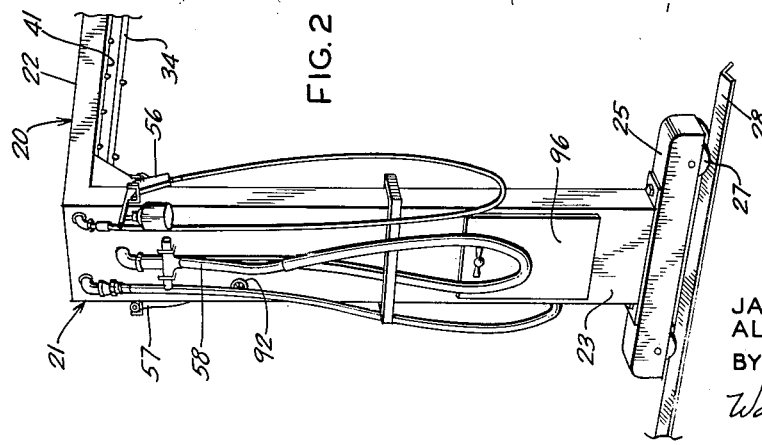
INVENTORS.
JAMES VANI
ALBERT J. MALPEDE
BY
*Wallace and Cannon*
ATTORNEYS

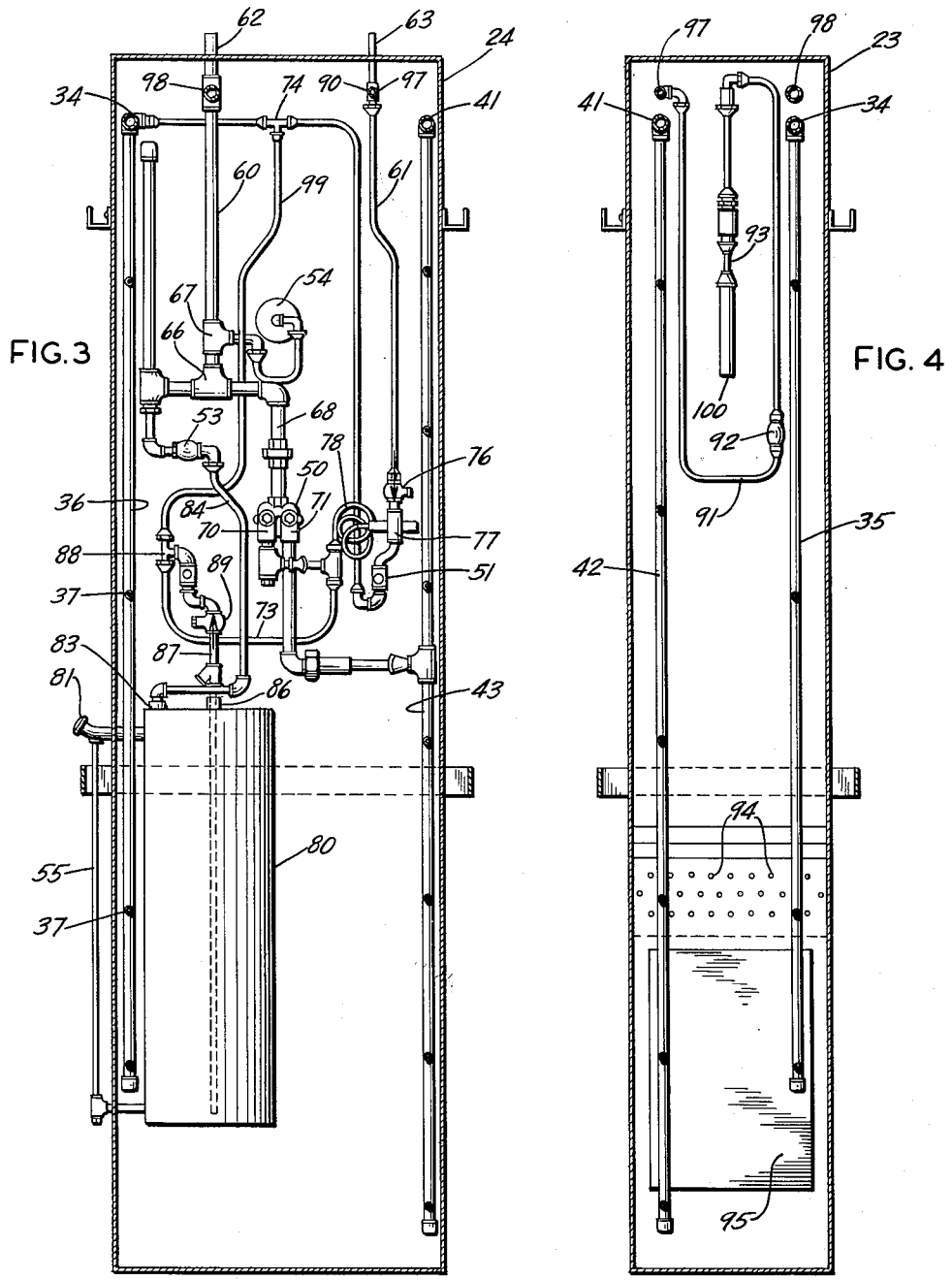

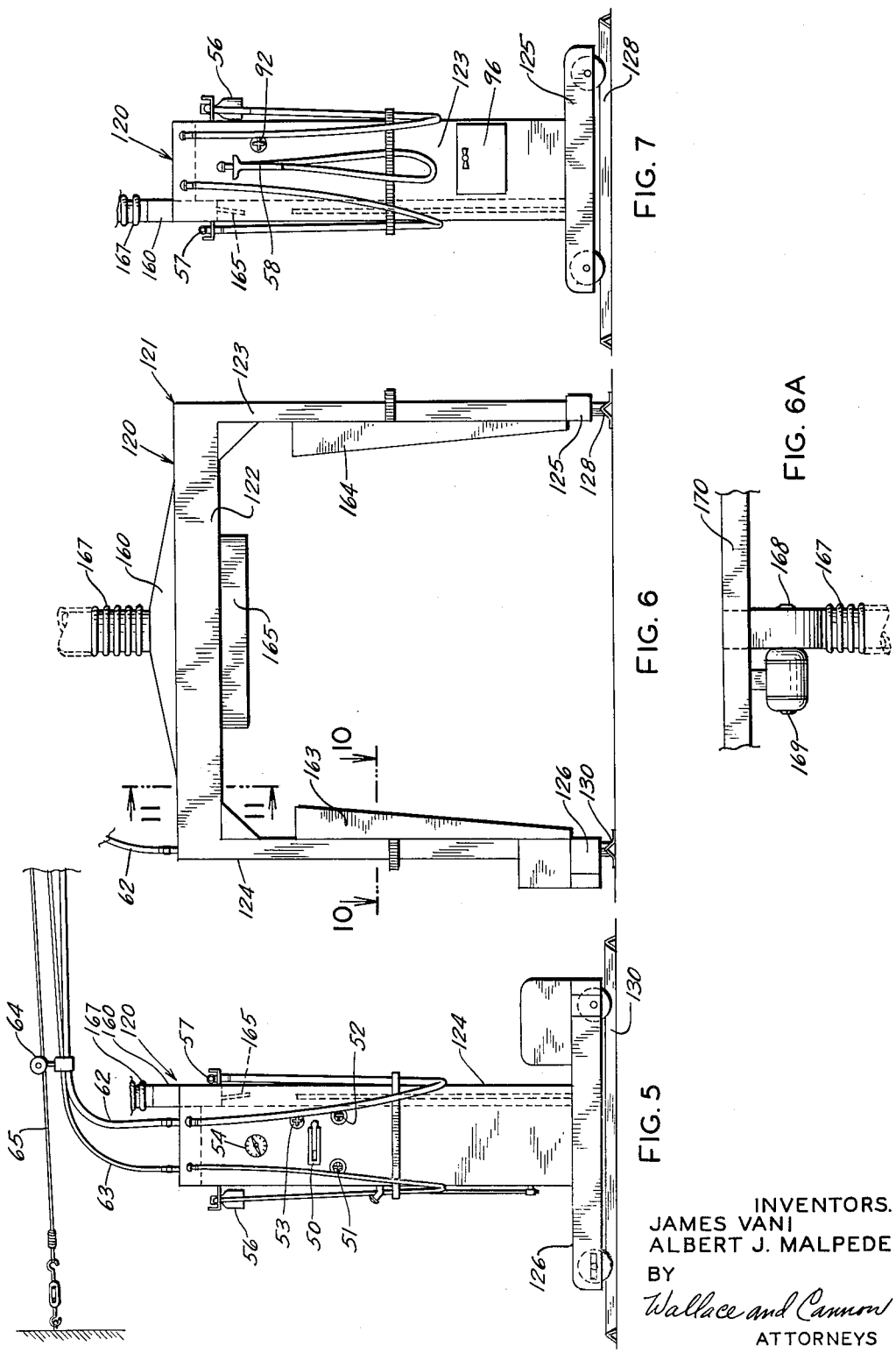

June 6, 1961 J. VANI ET AL 2,987,067
WASHING DEVICES
Filed Aug. 22, 1957 4 Sheets-Sheet 4

INVENTORS.
JAMES VANI
ALBERT J. MALPEDE
BY
*Wallace and Cannon*
ATTORNEYS

United States Patent Office 2,987,067
Patented June 6, 1961

2,987,067
WASHING DEVICES
James Vani, Midlothian, and Albert J. Malpede, Chicago, Ill., assignors to Service Metal Fabricators, Inc., Chicago, Ill., a corporation of Illinois
Filed Aug. 22, 1957, Ser. No. 679,722
4 Claims. (Cl. 134—102)

This invention relates to a new and improved vehicle washing unit and more particularly to a vehicle washing unit of the kind which cleans a vehicle by successive applications of a detergent solution and water in the course of successive movements along the vehicle.

One type of washer for automotive vehicles which has become increasingly popular comprises a plurality of substantially U-shaped conduits having a configuration such as to encompass a relatively narrow transverse sector of a vehicle, particularly a passenger car. Usuually, vehicle washers of this kind include one such conduit having a plurality of inwardly-directed spray nozzles mounted thereon, through which a soap or other detergent solution is sprayed onto the automotive vehicle. A second similar conduit is employed to rinse the vehicle. Vehicle washers of this kind may also be provided with a high pressure air supply which may be utilized for drying the vehicle and for other purposes; in units in which the air is employed in the drying process, a third U-shaped conduit with inwardly directed nozzles has been incorporated in the washer for this purpose. The washing units are frequently provided with storage tanks for the detergent solution, the entire washing apparatus being mounted for movement along spaced rails to permit coverage of the entire vehicle. A washing device of this kind may be installed in a relatively small working space, such as the space normally set aside in a service station for a wash rack. Such units are relatively inexpensive as compared with more complex washing equipment which moves the vehicle through the washer; a further advantage results from the fact that the unitary U-shaped washing unit may be conveniently operated by a single man.

Nevertheless, washing devices of the kind described hereinabove as previously known have exhibited certain difficulties and disadvantages in operation. The water and detergent mixing arrangements employed in some of these devices have tended to dilute the strength of the detergent solution in the course of successive operations of the device. As a result, an excess amount of detergent may be employed in some instances whereas an insufficient amount of cleaning agent may be applied to the vehicle in succeeding operations of the car washer. Mixing of the detergent solution and the water in the washing operation has in many instances been somewhat inconsistent, with the result that the full cleaning power of the detergent solution is not realized. In this respect, it should be noted that best results, in a device of this character, are achieved if the detergent is very thoroughly mixed with water and preferably foamed or emulsified to some extent before being discharged onto the vehicle. The control arrangements for some units of this class have been relatively complex, with the result that untrained personnel may experience some difficulty in accomplishing an effective washing job. A further disadvantage of previously known devices results from the fact that auxiliary equipment is frequently necessary for cleaning the vehicle wheels and, more particularly, the interior of the car. This latter point is of substantial importance in the washing of passenger cars, the most frequent application for washing devices of this kind.

A primary object of the invention, therefore, is a new and improved automotive vehicle washing unit which inherently eliminates or minimizes the above noted disadvantages and difficulties of previously known devices.

A more specific object of the invention is a new and improved self-contained automotive vehicle washing unit of the kind which cleans an automotive vehicle by successive traversals thereof and which requires a minimum of skill on the part of an operator.

A corollary object of the invention is a new and improved self-contained automotive vehicle washing unit which is substantially automatic in operation and requires actuation of but a single control to change from a wash to a rinse cycle.

Another important object of the invention is a new and improved self-contained manually operable automotive vehicle washing unit which exhibits substantially improved washing efficiency as compared with previously known devices.

A further object of the invention is a new and improved self-contained automotive vehicle washing unit which affords substantially uniform operational characteristics in the course of a relatively large number of washing operations.

An additional object of the invention is a new and improved self-contained automotive vehicle washing unit which is relatively simple and economical in construction.

A self-contained automotive vehicle washing unit constructed in accordance with the invention comprises at least one substantially U-shaped conduit having a plurality of inwardly-directed spray nozzles and adapted to encompass a relatively narrow sector of an automotive vehicle. The washing unit further comprises a water supply line and a high pressure air supply line; these two supply lines are provided with a common inlet to the aforementioned conduit. A control valve is interposed in the air supply line and is actuatable between an open condition and a closed condition. Preferably, this control valve is of the pressure-sensitive type and is connected to a given portion of the water supply line to be actuated in response to variations in water pressure therein. A tank is provided for storing a detergent solution and a mixing device is connected to the tank. This mixing device is also connected to the water supply line and is utilized to draw detergent solution into the water supply line in response to the movement of water through a given portion of that line. In addition, the washing unit comprises means for supporting the wash conduit, the supply lines, the tank and the associated control devices for movement relative to the vehicle being washed.

Other and further objects of the present invention will be apparent from the following description and claims and are illustrated in the accompanying drawings which, by way of illustration, show the preferred embodiments of the present invention and the principles thereof and what is now considered to be the best mode for applying those principles. Other embodiments of the invention embodying the same or equivalent principles may be used and structural changes may be made as desired by those skilled in the art without departing from the present invention and the purview of the appended claims.

In the drawings:

FIG. 1 is a perspective view of a self-contained automotive vehicle washing unit constructed in accordance with one embodiment of the invention;

FIG. 2 is a perspective view of a portion of the vehicle washing unit of FIG. 1;

FIG. 3 is a sectional elevation view showing the hydraulic and pneumatic system in one side of the vehicle washing unit of FIGS. 1 and 2; and FIG. 4 is a sectional view, similar to FIG. 3, of the opposite side of the vehicle washing unit;

FIG. 5 is a side elevation of a somewhat modified embodiment of the invention;

FIG. 6 is a front elevation of the embodiment of FIG. 5;

FIG. 6A is a detail view of a portion of the drying system of the washing unit;

FIG. 7 is a side elevation showing the opposite side of the washing unit of FIG. 5;

Figure 8:
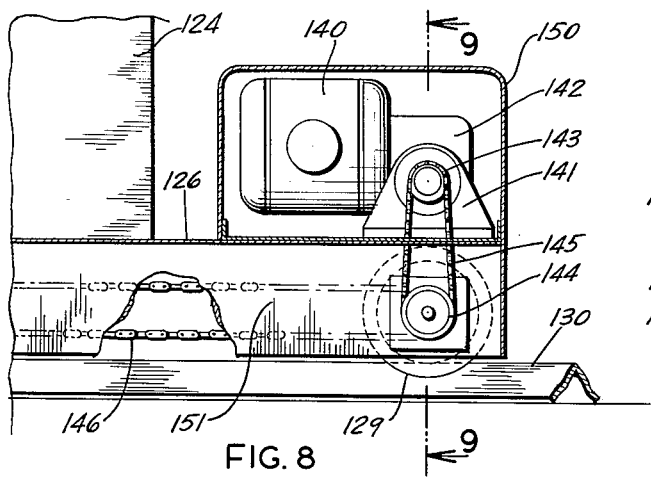
FIG. 8 is a detail sectional elevation view showing a power unit incorporated in the embodiment of FIGS. 5-7.

The automotive vehicle washing unit 20 illustrated in FIG. 1 comprises a substantially U-shaped frame 21 having a top section 22 and two opposed side sections 23 and 24. The frame 21 may be constructed from any desired material, but preferably is fabricated from ordinary sheet steel, adequately protected by rust prevention treatment and paint. The sheet metal frame 21 is supported upon a pair of trucks 25 and 26, which may also be fabricated from sheet steel.

The truck 25 is provided with a pair of wheels 27 which engage a track member 28; similarly, the truck 26 includes a pair of wheels 29 which engage and are movable along a rail 30. The two rails 28 and 30 are disposed in parallel relation to each other and are spaced from each other by a distance somewhat greater than the width of a conventional automotive vehicle such as a passenger car or a truck. The side portions 23 and 24 of the frame 20 are of a sufficient height to support the transverse section 22 above an automotive vehicle. For convenience in understanding of the invention, a conventional passenger car is shown in position to be washed by the unit 20, being indicated by the dash outline 32 in FIG. 1.

The vehicle washing unit 20 comprises a wash conduit 33 which is of substantially U-shaped configuration and which includes a transverse portion 34 and a pair of vertical or side portions 35 and 36. The wash conduit 33 is provided with a plurality of inwardly directed spray nozzles 37 which are utilized in spraying the automobile or other vehicle 32 with a detergent solution, as is explained more fully hereinafter. The washing unit 20 further includes a rinse conduit 40 which is substantially similar to wash conduit 33 and which includes a horizontal bight portion 41 and a pair of depending vertical or side portions 42 and 43. The rinse conduit 42 is also provided with a plurality of inwardly directed spray nozzles 45 and is utilized to rinse the automobile 32.

The controls for the vehicle washing unit 20 are disposed on the outer face of the frame section 24. They include a three-way selector valve 50 which comprises the principal control element of the washing unit and, in normal operation, is the only control element requiring actuation by the operator to carry out the basic car washing cycle. In addition, the frame section 24 supports an emulsifier valve 51, a detergent control valve 52, and a detergent tank filling valve 53, as well as a pressure gauge 54 and a sight gauge 55. The function and operations of these control elements are explained in detail hereinafter in connection with FIGS. 3 and 4.

The vehicle washing unit 20 also includes a pair of pneumatic spray guns 56, one being shown in each of FIGS. 1 and 2. A pair of water guns 57 are mounted on the car washing unit, being suspended upon the frame sections 23 and 24 respectively by suitable brackets or other means. In addition, and as shown in FIG. 2, the car washing unit is provided with a vacuum cleaning device 58 which may be utilized in cleaning the interior of a passenger car or like vehicle.

The basic mode of operation of the car washing unit 20 illustrated in FIGS. 1 and 2 is extremely simple and may be controlled by a substantially unskilled and untrained operator. At the start of the washing procedure, the unit 20 is moved to one end of the tracks 28 and 30. The vehicle to be washed is then positioned between the tracks as indicated by the dash outline 32. At this time, preferably, the washing unit 20 is moved to the center of the vehicle and the vacuum cleaning device 58 is employed to clean the interior thereof. Thereafter, the tires may be sprayed with a tire cleaning solution, using the pressure spray guns 56. This tire cleaning procedure is usually confined to vehicles with whitewall tires, and the spray guns 58 are provided with a special cleaner particularly intended for use on such tires.

After this preliminary procedure has been accomplished, the principal washing cycle is carried out with the washing unit 20. The washing unit is rolled to one end of the tracks 28 and 30 and the selector valve 50 is moved to its rinse position. The operator then moves the washing unit over the vehicle slowly in order that the entire vehicle may be rinsed with water discharged through the nozzles 45 in the rinse conduit 40.

After the first rinsing operation has been completed, the selector valve 50 is changed to its detergent or wash position. This change in the operating condition of the selector valve shuts off the discharge of water from the rinse conduit 40 and establishes a high pressure spray of detergent solution from the spray nozzle 37 of the wash conduit 33. The operator then moves the washing unit over the vehicle again, thereby subjecting the entire vehicle to a high pressure detergent spray. Preferably, the washing unit is moved more rapidly on this detergent-applying step of the washing cycle, although this is by no means essential.

After the detergent solution has been applied to the vehicle, it is usually desirable to rub the vehicle manually to loosen any dirt not already removed by the detergent spray. When this has been accomplished, the selector valve 50 is adjusted to its rinse position and the washing unit 20 again moved along the vehicle to rinse off the detergent solution and any dirt remaining on the vehicle. The water hoses 57 may then be utilized to rinse the front and rear bumpers and grill of the vehicle, since these parts of the vehicle may be disposed at an angle such that the ordinary rinsing operation afforded by the spray from the rinse conduit 40 is not always fully effective. The water guns 57 may also be employed in washing of the wheels and under the fenders of the vehicle. In some instances, it may be necessary to perform the rinsing operation twice to make sure that all detergent and dirt have been removed from the vehicle. This completes the washing cycle and the washing unit is then ready to work on the next vehicle.

The operation of the selector valve 50 and of the other controls of the washing unit 20, as well as the pneumatic and hydraulic system features of the invention, may best be understood by reference to FIGS. 3 and 4, which show the hydraulic and pneumatic systems in substantial detail. FIG. 3 is a sectional view of the portion of the hydraulic and pneumatic systems mounted within and supported above frame section 24 of the washing unit, whereas FIG. 4 shows the major operating components mounted within and supported upon the other frame section 23. As indicated in FIG. 3, the washing unit 20 is provided with a water supply line 60 and a high pressure air supply line 61. The water supply line 60 may be connected to any suitable source of water under pressure, such as a municipal or other water supply system. If necessary, a separate pressure system may be utilized to assure adequate pressure in the water supply, although the normal distribution pressures of municipal and like systems may in many instances be adequate. The water pressure is preferably 125 lbs. per square inch gauge or more. The air supply line is connected to a compressor or other suitable source of compressed air; generally speaking, an air pressure of the order of 125 lbs. per square inch gauge should be utilized. Connections to the water and air supply lines 60 and 61 may be accomplished by suitable flexible hoses 62 and 63 resepctively; the hoses may be supported above the washing unit by a pulley 64 riding upon a guide wire 65 as indicated in FIG. 1.

As shown in FIG. 3, the water supply line 60 is connected to a T 66, a T 67 being interposed in the line ahead of T 66 to permit connection of the line to the pressure gauge 54. One of the outlets from the T 66 is connected to a continuation section 68 of the water supply line which connects to the two way control valve 50. The valve 50 is provided with two outlet ports 70 and 71. The first of these outlet ports, port 71, is directly conected to the rinse conduit section 43. The other port 70 of the selector valve 50 is connected to a continuation portion 73 of the water supply line which connects to a venturi tube 74. The venturi tube 74 is of conventional construction, having a constricted throat portion with two substantially cone shaped inlet and outlet ports and a secondary or auxiliary inlet port opening into the constricted throat section. The water line section 73 is connected to the throat inlet of the venturi 74 for a purpose described more fully hereinafter. The outlet port of the venturi tube 74 is connected to section 36 of the wash conduit and also to section 34. The air supply line 61 is connected to the main inlet port of the venturi tube 74; thus, the water supply line and the high pressure air supply line are provided with a common inlet to the wash conduit of the washing unit.

A series of valves are interposed in the air supply line 61 to control the operation thereof. The first of these is a check valve 76 which serves to limit movement of air to the direction indicated by the arrow superimposed on the valve. The second valve interposed in the high pressure air supply line is a regulating valve 77. The regulating valve 77 is a pressure-sensitive device which is actuable between an open condition and a closed condition in response to pressure variations in the water supply line section or portion 73, being connected to the supply line section 73 by means of a tube 78. Any pressure-sensitive device capable of actuation in response to pressure changes in the water supply line may be utilized for this purpose; the pressure threshold for actuation of the valve 77 is not particularly critical, since it is only neceshary to dictate whether or not water under pressure is being admitted to the water supply line section 73 from the selector valve 50. The air control valve 77 may be a completely hydraulically actuated device or may comprise a solenoid operated or other electrical apparatus if desired. A bellows-operated valve suitable for this purpose is manufactured and sold as a standard item by the A.P. Manufacturing Co. of Milwaukee, Wisconsin. The third valve in the air supply line 61 is the emulsifier control valve 51, which is utilized to control the maximum amount of air which may be passed through the air supply line.

The supporting frame section 24 is also utilized to mount a storage tank 80 in the car washing unit. The tank 80 is employed to store a substantial quantity of a concentrated detergent solution for use in operation of the washing unit. The tank 80 is provided with a suitable filling conduit 81 which is accessible externally of the unit and is also preferably provided with the sight gauge 55 to indicate the level of the liquid contained within the tank. The sight gauge 55 enables the operator to determine whether or not a sufficient supply of liquid detergent is stored within the tank. A dip-stick or other measuring arrangement may be utilized instead of the sight gauge if desired.

The storage tank 80 is provided with an inlet opening 83 which is connected to the water supply line 60 by means of a tube or conduit 84 which connects into the T 66. The valve 53 is interposed in this conduit 84 and is utilized to admit water into the detergent storage tank 80 in the course of preparation of a detergent solution within the tank. The valve 53 is kept closed during the normal operation of the washing unit.

The detergent storage tank 80 is also provided with an outlet opening 86 which is connected, through a conduit 87, to a venturi tube 88 interposed in the section 73 of the water supply line. The venturi tube 88 is essentially similar to the previously described venturi 74. The main inlet and outlet openings of the venturi 88 are connected to the tubing comprising the water supply line section 73 and the detergent conduit 87 is connected to the auxiliary or suction opening in the constricted throat of the venturi tube. Preferably, a check valve 89 is interposed in the detergent tube 87 to prevent discharge of water from the supply line 73 into the storage tank 80.

As indicated hereinabove in connection with the description of FIG. 1, the wash conduit section 36 is connected to the wash conduit section 35 by horizontal section 34 and the two rinse conduit sections 42 and 43 are also interconnected by the transverse section 41. The conduit sections 35 and 42 are shown in FIG. 4. In addition, the high pressure air supply line 61 is provided with a T connection 90 and a connecting line 97 is run across the frame section 22 to connect to a further air supply line section 91 supported within the frame section 23. A shut off valve 92 is interposed in the air supply line section 91 and this portion of the air supply line terminates in a venturi tube 93, being connected to the main inlet port of the venturi. The outlet port of the venturi 93 is opened to the atmosphere within frame section 23 and the throat port of the venturi is connected to the vacuum cleaner 58 (see FIG. 2). A series of vent openings 94 are provided in the frame section 23 to prevent an excessive build-up of air pressure therewithin and to permit effective operation of the vacuum cleaner as described more fully hereinafter. In addition, a dust pan 95 is preferably mounted within the frame section 23, access to and removal of the dust pan being afforded by a door 96 in the frame section 23 as shown in FIG. 2. The water supply line 60 is also connected to the frame section 23 by means of a transverse line 98, FIGS. 3 and 4, to afford a water supply for the water gun 57 disposed on that side of the washing unit (see FIG. 2).

The pneumatic and hydraulic system illustrated in FIGS. 3 and 4 automatically carries out a series of different operations in the course of a washing cycle. As indicated herein above, at the beginning of a washing cycle, the selector valve 50 is actuated to its rinse position. With the valve in this position, water entering the system through the initial supply line section 60 passes through the additional supply line section 68 and through the port 71 of valve 50 into the rinse conduit 41–43 of the washing unit. The outlet port 70 of the selector valve is maintained closed, so that no water is suppled to the wash or detergent conduit 34–36. Moreover, as indicated hereinabove, the tank fill valve 53 is kept closed so that no water enters the detergent tank 80.

After the rinsing cycle has been completed, the selector valve 50 is moved to its wash or detergent position, closing port 71 and opening the alternate port 70. As a consequence, the discharge of water through the rinse conduit of the washing unit is interrupted. Water under pressure is discharged from the port 70 into the continuation portion 73 of the water supply line. As a result, the internal pressure developed within the supply line portion 73 increases, opening the pressure-sensitive control valve 77. The opening of the valve 77 admits high pressure air from the air supply line 61 into the venturi 74. Consequently, the high pressure stream of air passing through the venturi tube creates a suction force which assists in drawing water from the supply line portion 99 connecting the venturi 74 to water supply line section 73. In the same manner, the stream of water passing through the venturi 88 draws the concentrated detergent solution from the tank 80 into the water supply line.

The two venturi tubes 74 and 88 accomplish two highly important functions. The venturi 88 provides a simple and convenient means for drawing the detergent solution from the storage tank 80 and, in addition, assures a thorough mixing action which uniformly disperses the detergent solution in the water flowing through the supply line. In the same manner, the venturi 74 effectively serves as a booster pump for the water and thoroughly mixes the air with the water. As a consequence, the water and detergent solution entering the venturi 74 from the section 99 of the water supply line is thoroughly mixed with and emulsified by the air stream. Accordingly, a high pressure emulsified detergent solution is discharged through the detergent nozzles 37, affording an effective and efficient cleaning action as applied to an automotive vehicle. As described hereinabove, subsequent rinse operations may be accomplished by returning the selector valve 50 to its rinse position, thereby automatically closing the air and detergent supply sections of the system and diverting the water flow directly to the rinse conduit of the unit. The changeover between wash and rinse operations may be accomplished by individual valves in separate branches of the water supply line. Preferably, however, the selector valve 50 is a three-way device capable of directing the flow of water through either of outlet ports 70 and 71 and also capable of closing off both ports. Three-way valves of this type are available as standard commercial products; for example, a suitable valve is available as a standard item from the Kingston Manufacturing Company.

As indicated hereinabove, the tank fill valve 53 is maintained closed during normal operation of the washing unit. When it is necessary to replenish the detergent solution supply in the tank 80, a highly concentrated detergent may be introduced into the tank through the inlet conduit 81, either in powder or liquid form. The valve 53 may then be opened for a period sufficient to fill the tank 80 and dilute the detergent to any desired strength. To assure thorough mixing of the detergent and water within the tank 80, it is preferable that the concentrated detergent be introduced in liquid form.

The amount of detergent solution drawn into the water supply line through the venturi 88 is substantially independent of the quantity of detergent available in the storage tank 80. Consequently, the washing unit applies a uniform amount of the detergent solution to the vehicle being washed regardless of the level of the detergent within the storage tank. Operation of this portion of the hydraulic system is therefore substantially independent of the number of times the washing unit has been employed in washing a vehicle since the last filling of the detergent solution tank. The valve 51 controls the amount of air introduced into the wash conduit during the washing stage of the cycle; once adjusted for best results, it requires no further adjustment during normal operation. The gauge 54 is utilized to afford an indication as to whether or not there is sufficient water pressure available for proper operation of the washing unit.

The valve 92, like the valve 51, is adjusted when the washing unit is first placed in operation and normally requires no further adjustment thereafter. This valve controls the amount of air which is fed to the vacuum cleaner venturi 93. The vacuum venturi, through its connection to the vacuum cleaner attachment 58, is utilized to draw air through the vacuum cleaner attachment and thereby afford a means for cleaning the interior of the automotive vehicle. The dirt and other foreign matter drawn into the venturi in this operation is discharged through the discharge opening 100 of the vacuum venturi and settles into the dust pan 95. The air presure within the frame section 23 is prevented from building up excessively by the outlet openings 94.

The washing unit 20 described and illustrated in FIGS. 1-4 affords a completely self-contained washer which effectively cleans an automotive vehicle inside and out without requiring auxiliary equipment or attachments. The controls are exceedingly simple, the principal washing cycle being controlled by the single manually operable selector valve 50. Consequently, the washing unit is easily handled by an operator having virtually no training or special skill. The washing action is inherently consistent and is in no way dependent upon the number of or sequence of washing procedures carried out. The detergent is very thoroughly mixed and emulsified with the water before being discharged onto the vehicle, affording a substantially improved cleaning action as compared with previously known devices. Moreover, the washing unit 20 is relatively simple and economical in construction; one very important contributing factor in this regard is the extreme simplicity and relatively low cost of the venturi devices 74 and 88 utilized for mixing the air, water, and detergent.

The self-contained washing unit 120 illustrated in FIGS. 5-7 is essentially similar in many respects to the washing apparatus 20 of FIGS 1-4. This second embodiment of the invention comprises a substantially U-shaped frame 121 including a transverse horizontal section 122 and a pair of vertically extending side sections 123 and 124. As before, the frame sections 123 and 124 are mounted upon a pair of trucks 125 and 126 which engage a pair of guide rails 128 and 130.

The controls for the basic washing operation in this embodiment of the invention and the special washing and cleaning devices incorporated in the washing unit are essentially similar to those of the first described embodiment. Thus, the washing unit includes a pair of conduits (not shown) for washing and rinsing purposes, essentially similar to conduits 33 and 40 of the washing unit 20. Moreover, the washing unit is equipped with essentially the same controls, including the selector valve 50, the emulsifier or air control valve 51, the detergent control valve 52, the tank fill valve 53, and the water pressure gauge 54 (FIG. 5). Suitable spray guns 56 are provided on each side of the washing unit and the water guns 57 may also be incorporated in this embodiment of the invention. A vacuum cleaner device 58 is mounted upon the frame section 123 in essentially the same manner as in the previously described embodiment. Water and air under pressure are supplied to the unit through the conduits 62 and 63 which, as before, may be suspened by the trolley 64 from a guide line 65. The internal pneumatic and hydraulic system illustrated in FIGS 3 and 4 may be incorporated in essentially identical form in the washing unit 120; accordingly, the interior piping and valve arrangement for this embodiment is not illustrated in the drawings.

There are certain substantial differences, however, between washing units 20 and 120. The unit 120 is a self-propelled one; that is, it includes a power mechanism for moving the washing unit along the rails 128 and 130. In addition, the washing unit 120 includes a drying system not incorporated in the previously described embodiment.

Figure 9:
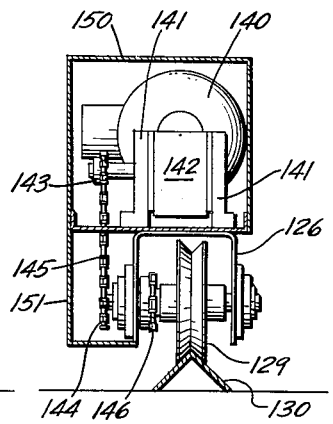
FIG. 9 is a sectional view taken along line 9—9 in FIG. 8.

The motorized or self-propelled construction of the washing unit 120 is best illustrated in the detailed views of FIGS. 8 and 9. As indicated therein, a motor 140 is mounted upon the truck 126 by a suitable mounting arrangement such as the mounting brackets 141. The motor 140 may comprise any relatively small motor device capable of reversible operation and therefore adapted to drive the washing unit in either direction along the rails 128 and 130. The motor is connected through a speed-reduction gear box 142 to a sprocket 143 and the sprocket 146 in turn is connected to a pulley 144 by means of a drive chain 145. The pulley 144 is mounted on and affixed to the shaft supporting the truck wheel 129. A connection to the other wheel of the truck is provided by a second drive chain 146 which extends between the two wheels of the truck. The motor and the drive chains are preferably enclosed in suitable housings 150 and 151. The simple drive arrangement illustrated in FIGS. 8 and 9 may be utilized to drive the washing unit 120 along the guide rails 128 and 130 and thereby relieve the washing unit operator of the necessity of manually effecting the requisite movement of the washing unit. Although the use of a motorized drive is not essential, it is preferred that the unit 120 be self-propelled, since it is made somewhat heavier and more cumbersome to move than the initially described car washing unit 20 by addition of a drying apparatus thereto.

Figures 10, 11:
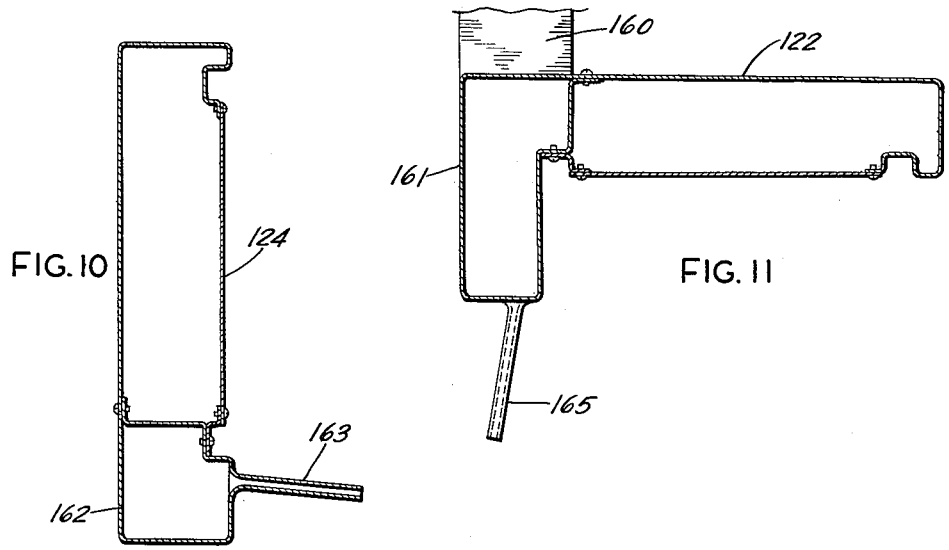
FIG. 10 is a sectional view taken along line 10—10 in FIG. 6.
FIG. 11 is a sectional view taken along line 11—11 in FIG. 6.

The drying arrangement incorporated in the washing unit 120 is best illustrated in FIGS. 6, 6A, 10 and 11. As indicated in FIG. 6, a hood 160 is mounted upon the transverse section 122 of the washing unit frame. This hood 160 connects with a frame section 161 which is secured to and forms a part of frame section 122 as indicated in FIG. 11. The frame section 161 comprises an air conduit which connects with two corresponding vertical conduits such as the portion 162 of the vertical frame section 124 (see FIG. 10). An elongated outlet duct 163 is provided for the duct section 162 and opens inwardly of the U-shaped washing unit. A similar outlet duct 164 is provided for the opposite side of the washing unit and an overhead outlet duct 165 is provided in the transverse air conduit section 161. The hood portion 160 of the washing unit is also connected, by means of a relatively large flexible hose or conduit 167, to a blower 168. The blower 168, which is powered by a motor 169, may be supported from a rafter, beam, or like structural element 170 above the central portion of the area covered by the washing unit.

In operation, the washing unit 120 is controlled and actuated in essentially the same manner as described hereinabove in connection with the washing unit 20 to complete the washing cycle, except of course, that movements of the washing unit are effected by means of the propulsion unit comprising motor 140 rather than by manual actuation on the part of the operator. After the washing cycle has been completed, the blower motor 169 is energized to put the blower 168 in operation. The blower forces air through the conduit 167 and into the hood 160, from which it is distributed through the conduit sections affixed to the frame 121. The air is forced outwardly under pressure from the outlet ducts 163–165 and is discharged onto the automobile being cleaned. Consequently, by moving the car washing unit transversely of the vehicle with the blower 168 in operation, a rapid and highly efficient drying action may be accomplished. In this manner, accumulation of dirt on the vehicle while still wet from the washing operation is prevented. The controls for the propulsion unit and the drying unit of the car washer 20 may be extremely simple; a reversing switch is required for the motor 140 and a switch is also needed for the blower motor 169. In this connection, it should be noted that the propulsion unit may be provided with suitable limit switches to shut off the motor 140 as it approaches the end of the tracks. Any of the many commercially available limit switch arrangements may be utilized for this purpose.

Hence, while we have illustrated and described the preferred embodiments of our invention, it is to be understood that these are capable of variation and modification, and we therefore do not wish to be limited to the precise details set forth, but desire to avail ourselves of such changes and alterations as fall within the purview of the following claims.

We claim:
1. A self-contained automotive vehicle washing unit comprising: a substantially U-shaped wash conduit, having a plurality of inwardly-directed spray nozzles, adapted to encompass a relatively narrow sector of an automotive vehicle; a water supply line and a high-pressure air supply line; a pressure-sensitive air control valve, interposed in said air supply line and connected to a first portion of said water supply line, actuatable between an open condition and a closed condition in response to variations in pressure in said first portion of said water supply line above and below a preselected threshold value; a tank for storing a detergent solution; mixing means, interposed in a second portion of said water supply line and having an inlet port connected to said tank, for drawing detergent solution into said water supply line in response to movement of water through said second portion of said water supply line, without diluting the detergent solution in said tank; further mixing means, connecting said water supply line and said air supply line to an inlet port in said wash conduit, for intimately mixing and emulsifying said detergent, water and air before emission from said nozzles; and means for supporting said wash conduit, said supply lines and said tank for movement relative to a vehicle to be washed.

2. A self-contained automotive vehicle washing unit comprising: a substantially U-shaped wash conduit, having a plurality of inwardly-directed spray nozzles, adapted to encompass a relatively narrow sector of an automotive vehicle; a water supply line; a high-pressure air supply line, connected to said wash conduit; a venturi tube interposed in said air-supply line and having an inlet port connected to said water supply line to draw water into said air supply line and said wash conduit; a pressure-sensitive air control valve, interposed in said air supply line and connected to a first portion of said water supply line, actuatable between an open condition and a closed condition in response to variations in pressure in said first portion of said water supply line above and below a preselected threshold value; a tank for storing a detergent solution; a venturi tube, interposed in a second portion of said water supply line and having an inlet port connected to said tank, for drawing detergent solution into said water supply line, without diluting the detergent solution in said tank; and means for supporting said wash conduit, said supply lines, and said tank for movement relative to a vehicle to be washed.

3. A self-contained automotive vehicle washing unit comprising: a substantially U-shaped wash conduit and a similar rinse conduit, each having a plurality of inwardly-directed spray nozzles and adapted to encompass a relatively narrow sector of an automotive vehicle; a water supply line and a high-pressure air supply line; a pressure-sensitive air control valve, interposed in said air supply line and connected to a first portion of said water supply line, actuatable between an open condition and a closed condition in response to variations in pressure in said first portion of said water supply line above and below a preselected threshold value; means, comprising a three-way valve interposed in said water supply line ahead of said first portion thereof, for effectively disconnecting said water supply line from said wash conduit inlet and for connecting said water supply line to said rinse conduit; a tank for storing detergent solution; mixing means, interposed in a second portion of water supply line and having an inlet port connected to said tank, for drawing detergent solution into said water supply line in response to movement of water through said second portion of said water supply line, without diluting the detergent solution in said tank; further mixing means, connecting said water supply line and said air supply line to an inlet port in said wash conduit, for intimately mixing and emulsifying said detergent, water and air before emission from said nozzles; and means for supporting said conduits, said supply lines, and said tank for movement relative to a vehicle to be washed.

4. A self-contained automotive vehicle washing unit comprising: a substantially U-shaped wash conduit, having a plurality of inwardly-directed spray nozzles, adapted to encompass a relatively narrow sector of an automotive vehicle; a water supply line; a high-pressure air supply line connected to said wash conduit; a control valve, interposed in said air supply line and actuatable between an open condition and a closed condition; a tank for storing a detergent solution; a first mixing means, interposed in said water supply line and having an inlet port connected to said tank, for drawing detergent solution into said water supply line in response to movement of water through a given portion of said water supply line, without diluting the detergent solution in said tank; a second mixing means, interposed in said air supply line and having an inlet port in said water-detergent line, for drawing detergent and water into said air supply line in response to movement of air under pressure through said air supply line and for intimately mixing and emulsifying said detergent, water and air before emission from said nozzles; and means for supporting said wash conduit, said supply lines, and said tank for movement relative to a vehicle to be washed.

References Cited in the file of this patent

UNITED STATES PATENTS

| | | |
|---|---|---|
| 577,006 | Brown | Feb. 16, 1897 |
| 1,487,062 | Hohl | Mar. 18, 1924 |
| 1,502,115 | Nicholson | July 22, 1924 |
| 1,540,743 | Badaracco | June 9, 1925 |
| 1,970,674 | Seibert et al. | Aug. 21, 1934 |
| 2,180,694 | Reed | Nov. 21, 1939 |
| 2,210,846 | Aghnides | Aug. 6, 1940 |
| 2,355,882 | Malsbary et al. | Aug. 14, 1944 |
| 2,475,832 | Gilliland | July 12, 1949 |
| 2,526,265 | Nulph | Oct. 17, 1950 |
| 2,648,342 | Van et al. | Aug. 11, 1953 |
| 2,699,792 | Fisher | Jan. 18, 1955 |
| 2,703,579 | Merancy et al. | Mar. 8, 1955 |
| 2,745,418 | Balcom et al. | May 15, 1956 |
| 2,788,009 | Lones | Apr. 9, 1957 |